United States Patent [19]
Ciciora

[11] 4,303,940
[45] Dec. 1, 1981

[54] RASTER MANIPULATED TELEVISION RECEIVER

[75] Inventor: Walter S. Ciciora, Park Ridge, Ill.

[73] Assignee: Zenith Radio Corporation, Glenview, Ill.

[21] Appl. No.: 167,988

[22] Filed: Jul. 14, 1980

[51] Int. Cl.³ .............................................. H04N 7/08
[52] U.S. Cl. .................................. 358/142; 350/147;
350/148; 350/180; 350/140
[58] Field of Search ............... 358/142, 146, 147, 148,
358/140, 85, 180; 315/395; 340/723, 731, 748, 750

[56] References Cited

U.S. PATENT DOCUMENTS 4,148,077  4/1979  Bragas .................................. 358/140
4,233,628  11/1980  Ciciora ................................ 358/142

FOREIGN PATENT DOCUMENTS 55-52684  4/1980  Japan .................................. 358/140
7805955  6/1978  Netherlands ....................... 358/140

Primary Examiner—Michael A. Masinick
Attorney, Agent, or Firm—Jack Kail

[57] ABSTRACT

A television receiver is disclosed for selectively displaying either a 525 line NTSC video signal or a 625 line European teletext or Viewdata signal. The receiver includes two vertical countdown circuits: a 525 line countdown circuit for use in generating an NTSC type raster, and a 625 line countdown circuit for use in generating a 625 line raster. Switch means are provided for selecting between the two signals generated by the countdown circuits. The receiver CRT uses self-converging, in-line guns.

7 Claims, 1 Drawing Figure

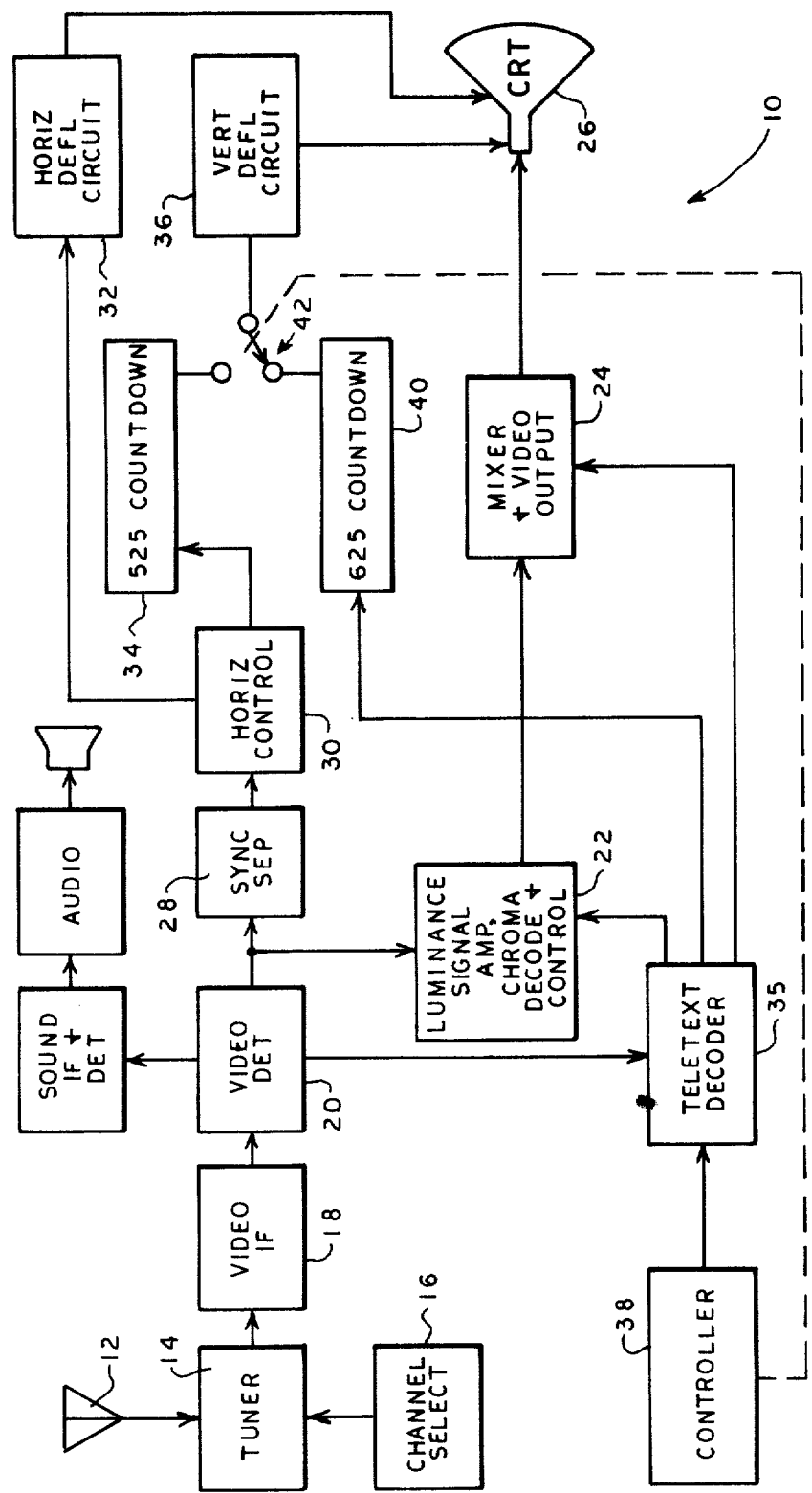

RASTER MANIPULATED TELEVISION RECEIVER

BACKGROUND OF THE INVENTION

The present invention relates to teletext systems.

Teletext is a video communication arrangement wherein text, sometimes augmented with simple graphics, presents a message which is transmitted in a highly efficient digital form, generally in fundamental units called pages. In the case of teletext, this data is typically communicated during the vertical interval of a television signal.

In European television and Viewdata systems, 625 lines per frame are used, and the display format is 24 text lines per frame of display. In the NTSC system used in the United States, 525 lines per frame are used, with 20 lines of teletext display. Certain problems arise when a European teletext signal is to be displayed on a receiver constructed to NTSC specification. If a European-format teletext or Viewdata signal were presented to a typical NTSC teletext-equipped receiver, some of the rows of text would not be displayed on the screen.

One solution to this problem is to reformat the teletext or Viewdata information. This would include removing and regenerating timing signals at a different rate, which would require substantial logic circuitry and is too expensive for many applications.

It is therefore an object of the present invention to provide a less expensive arrangement for displaying European format teletext or Viewdata information on an NTSC receiver.

Another object is to provide a means for displaying one system teletext type data originally formatted on a different, incompatible system.

DESCRIPTION OF THE PREFERRED EMBODIMENT

The accompanying FIGURE illustrates a teletext (here intended to include Viewdata) equipped television receiver 10 in accordance with the present invention. The receiver 10 includes a typical antenna or cable input 12, tuner 14, channel selecter 16, video demodulator including an intermediate frequency section 18 and detector 20, a chroma decoder, luminance signal amplifier and control section 22, and a mixer and video output stage 24 providing video signals to a cathode ray tube (CRT) 26. Synchronization is provided by a sync separator 28 connected to a horizontal control circuit 30. Circuit 30 provides an output to a horizontal deflection circuit 32. Vertical synchronization is provided by, illustratively, a digital system called a countdown circuit 34 suitable for use with normal NTSC signals. Countdown circuit 34 receives horizontal control pulses from circuit 30 and generates vertical sync signals which are, in turn, applied to a vertical deflection circuit 36. CRT 26 is coupled to deflection circuits 32 and 36.

The teletext portion of the receiver 10 includes a teletext decoder 35 receiving demodulated signals from the video detector 20. Control of various functions, such as requests for a channel identification, time display, index display, textual updating activation or deactivation, for instance, is provided via a controller 38 which may be manually or remotely controlled. The teletext portion of the receiver shares the mixer and video output stage 24. In operation, the teletext portion of the receiver 10 receives demodulated digital data, decodes it, and holds the data in accordance with user entered commands. When a teletext display command is entered, receiver 10 interrupts commercial television programming and causes a page of text to be displayed on CRT 26.

According to one aspect of the present invention, a further countdown circuit 40 is provided to count 625 lines for vertical synchronization in accordance with European standards. Such a countdown circuit is available as Zenith part no. 221-556. Illustratively countdown circuit 40 is arranged parallel to countdown circuit 34 and receives its input from teletext decoder 35. Countdown circuit 40 provides synchronizing signals to vertical deflection circuit 36.

In the embodiment illustrated, a switch device 42 is provided to select between countdown circuit 34 for an NTSC signal or countdown circuit 40 for a European type signal. Switch device 42 is responsively coupled to controller 38. It will be appreciated that other arrangements can be devised within the scope of the present invention so that the vertical deflection circuit 36 would be responsive to a selected one of the two countdown circuits. For example, switch 42 could be included in vertical deflection circuit 36.

Typically CRT 26 uses in-line guns and is self-converging. One excellent tube for this purpose is Zenith model 25VFCPZZ. Even though it may be designed for an NTSC system, it will operate at the 625 line per frame teletext format without difficulty. As a result, the European type teletext or Viewdata signal, communicated during the vertical interval, will be displayed in 24 line format on the CRT 26 of a standard NTSC receiver modified as described above.

It will be appreciated that this system can be used to display an NTSC teletext signal on a European television receiver. Various modifications and alterations will be apparent to those skilled in the art, and such modifications and alterations are within the scope of the present invention.

What is claimed is:

1. In a television receiver of the type having means for detecting video signals, means for decoding teletext information, a sync separator, and a vertical deflection circuit and a horizontal deflection circuit providing inputs to a cathode ray tube, the improvement comprising:

digital synchronization means for providing vertical synchronization signals in first or second modes, said first mode corresponding to display of signals in a first format, said second mode corresponding to display of signals in a second format, said digital synchronization means being coupled to the sync separator and to the means for decoding teletext information; and means for selecting one of said first and second modes for use in combination with the vertical deflection circuit, whereby teletext type signals are displayed in said second format.

2. The improvement of claim 1 wherein said digital synchronization means comprises:

a first digital synchronization circuit corresponding to said first mode and having an input;

means coupling said first digital synchronization circuit input to the sync separator;

a second digital synchronization circuit corresponding to said second mode and having an input; and means coupling said second digital synchronization input to the means for decoding teletext information.

3. The improvement of claim 2 wherein said first and second digital synchronization circuits are driven in parallel and wherein said selecting means comprises switch means associated with the vertical deflection circuit for selecting between said first and second digital synchronization circuit.

4. The improvement of claim 1, 2 or 3 wherein said selecting means is responsive to a controller associated with the teletext decoding means.

5. The improvement of claim 1 or 2 wherein the television receiver cathode ray tube includes self-converging, in-line guns.

6. A television receiver for receiving and displaying NTSC video signals in NTSC format or European teletext or Viewdata signals in a format having 24 lines of text comprising:
- input means including means for demodulating and detecting received video signals;
- a sync separator circuit arrangement coupled to receive signals from said input means;
- a teletext decoder and control circuitry coupled to said input means;
- a CRT;
- a horizontal deflection circuit coupled to said CRT and to said sync separator circuit arrangement;
- NTSC countdown circuit and a European signal countdown circuit for developing vertical synchronization signals;
- means for coupling said NTSC countdown circuit to said sync separator arrangement;
- means for coupling said European signal countdown circuit to said teletext decoder and control circuitry;
- a vertical deflection circuit having an output coupled to said CRT;
- switch means for engaging a selected one of said countdown circuits with said vertical deflection circuit in accordance with the type of signal to be displayed, said switch means being responsively coupled to said teletext circuitry, whereby said CRT is driven at the NTSC rate for displaying an NTSC video picture and is driven at the European rate for displaying European teletext or Viewdata data.

7. The receiver of claim 6 wherein said CRT includes self-converging, in-line guns.

* * * * *